Patented May 11, 1926.

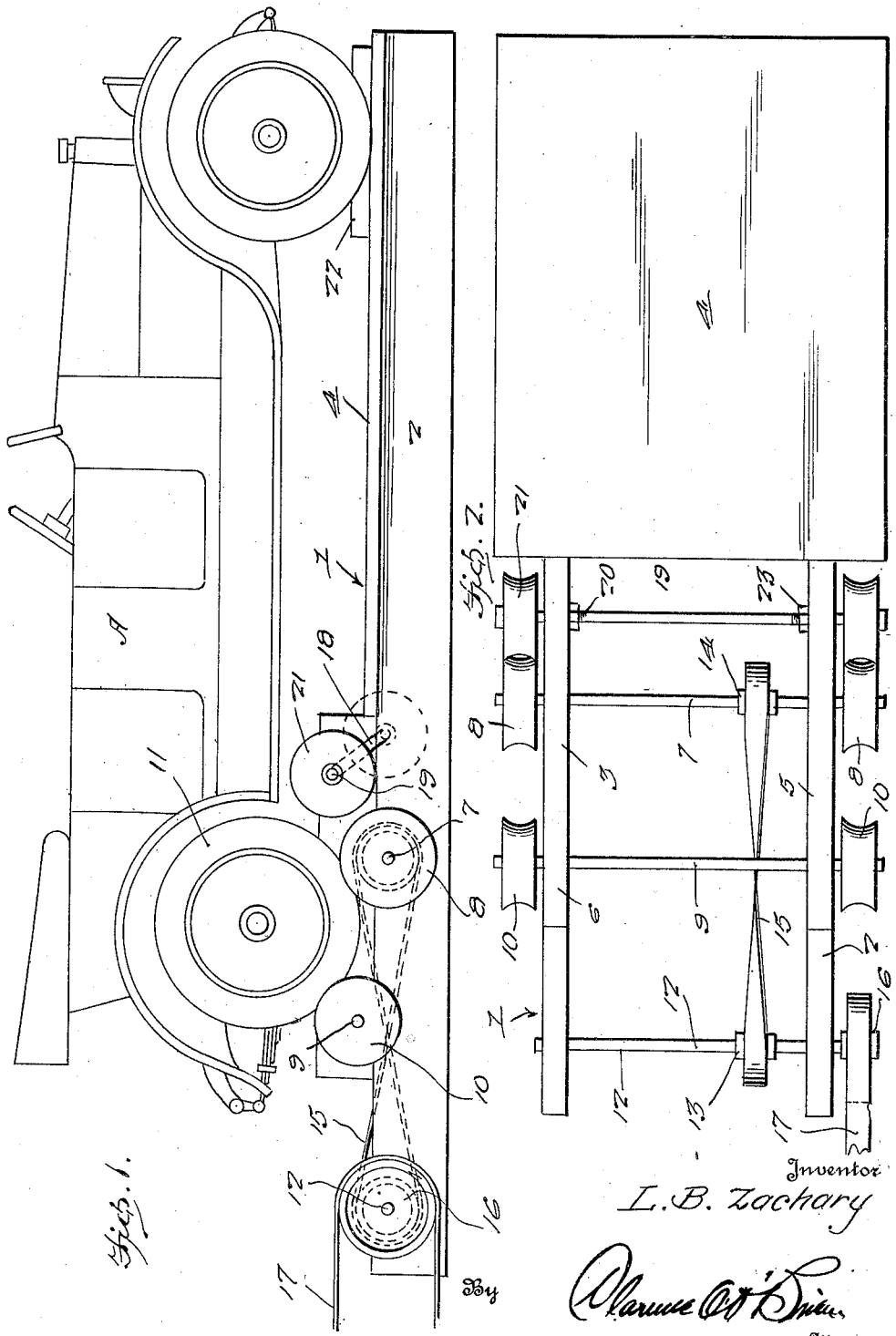

1,584,065

UNITED STATES PATENT OFFICE.

LEE B. ZACHARY, OF ISLAND MOUNTAIN, CALIFORNIA.

AUTOMOBILE POWER-TRANSMITTING DEVICE.

Application filed July 9, 1925. Serial No. 42,463.

This invention relates to improvements in automobile power transmitting devices and has for its principal object to provide a jack which when placed in use will utilize the power of an automobile for various commercial purposes such as operating wood sawing machines, churns, and the like.

One of the important objects of the present invention is to provide an automobile power transmitting device of the above mentioned character wherein the same includes rear wheel supporting means, the latter being adapted to be driven thereby for actuating a power transmitting means, additional means being provided for preventing the forward movement of the rear wheels of the automobile so that the same are maintained in engagement with the wheel supporting means when the device is in use.

A still further object is to provide an automobile power transmitting device of the above mentioned character wherein the means for preventing the forward movement of the rear wheels of the automobile so that the latter will be in engagement with the wheel supporting means, also acts as a drive means for the rear wheels of the automobile when the automobile is moved rearwardly on the frame for positioning the rear wheels on the supporting means therefor.

A further object is to provide an automobile power transmitting device of the above mentioned character which is simple in construction, inexpensive, strong and durable and further well adapted to the purpose for which it is designed.

Other objects and advantages of the invention will become apparent during the course of the following description taken in connection with the accompanying drawing.

In the accompanying drawing forming a part of this application, and in which like numerals designate like parts throughout the same:

Figure 1 is a side elevation showing the device in use, and

Figure 2 is a top plan view of the power transmitting device embodying my invention.

In the drawing wherein for the purpose of illustration is shown the preferred embodiment of my invention, the numeral 1 designates generally the frame forming a part of the present invention, the same including the parallel spaced beams 2 and 3 respectively. A base board 4 is supported on the forward end of the beam. Suitable blocks 5 and 6 are supported on the upper edges of the beams adjacent the rear ends thereof.

A transversely extending shaft 7 has its ends extending through the spaced beams and supported on the respective ends of the shaft are the grooved pulleys 8. The shaft 7 is supported on the frame in such a manner as to be adapted to rotate freely. A similar shaft 9 is journaled in the blocks 5 and 6 at a point rearwardly of the shaft 5, the ends of the last mentioned shaft extending beyond the sides of the blocks, and support thereon the grooved pulleys 10. The grooved pulleys on the respective ends of the shafts 7 and 9 are adapted to cooperate in supporting the rear wheels 11 of a motor vehicle designated generally by the letter A.

A rotatable shaft 12 is journaled transversely in the rear ends of the spaced beams 2 and 3 of the frame 1. A pulley 13 is secured on the shaft 12 and is disposed in alignment with a similar pulley 14 which is arranged on the shaft 7. A belt 15 extends over the aligned pulleys, and provides a means whereby the shaft 12 may be rotated through the medium of the rotation of the shaft 7. A power transmitting pulley 16 is secured on one end of the driven shaft 12 and a suitable power belt 17 is associated therewith, the same being adapted to be connected with the machinery which is to be driven by my improved power transmitting device.

A rearwardly inclined slot 18 is formed in the forward end of each of the blocks, said slots being adapted to register with each other and slidable in the slot is a transversely extending rod 19 The respective ends of the rod 19 are threaded as illustrated at 20, and the ends of this rod extend beyond the sides of the frame, and support thereon the grooved guide wheels 21. The purpose of these guide wheels will be hereinafter more fully described. The lower ends of the aforementioned slots extend into the upper edges of the beams as illustrated more clearly in Figure 1.

Normally, the rod 19 is in its lowermost position in the slots, and when in this position, the grooved wheels 21 carried by the outer ends of the rods will act as guide rollers for the rear wheels of the motor vehicle as the same are moved rearwardly over the frame so that the rear wheels 11 may be properly positioned over the grooved pulleys 8 and 10. It is of course understood that a suitable skid is placed at the forward end of the frame to permit the rear wheels of the vehicle to move onto the frame. Suitable chocks are adapted to be placed on the base board 5 at the forward end thereof supporting the front axle of the automobile, and one of the chocks is illustrated at 22 in the drawing.

When the rear wheels 11 of the motor vehicle are supported on the pairs of grooved pulleys 8 and 10, the rod 19 is moved upwardly in the slots provided therefor, and the nuts 23 are then tightened so as to be brought into engagement with the inner sides of the respective blocks so as to hold the rod 19 in its uppermost position in the slot, and when in this position, the grooved guide wheels 21 will be disposed above the grooved pulleys 8, as is clearly illustrated in Figure 1. When the guide wheels 21 are in the position as shown in Figure 1 of the drawing, they will prevent the rear wheels 11 of the motor vehicle from moving forwardly and out of engagement with the grooved pulleys on the shafts 7 and 9.

It is obvious that when the engine of the automobile is started, the rotation of the rear wheels will drive the shafts 7 and 9 through the medium of the pairs of grooved pulleys 8 and 10, and as a result, the shaft 12 will be driven by means of the belt 15, and the pulleys 13 and 14 respectively, so that power can be transmitted from this shaft to the machinery to be driven.

While I have shown the preferred embodiment of the invention, it is to be understood that minor changes in the size, shape and arrangement of parts may be resorted to without departing from the spirit of the invention and the scope of the appended claims.

Having thus described the invention, what I claim as new and desire to secure by Letters Patent is:—

1. An automobile power transmitting device comprising a frame, means for supporting the rear wheels of an automobile, and arranged to be driven thereby, power transmitting means associated with the aforementioned means, a transversely extending rod slidably supported on the frame and arranged forwardly of the wheel engaging means, grooved wheels supported on the ends of said rod, said wheels providing a guide for positioning the rear wheels of the automobile onto said wheel supporting means when the rod is in one position, said wheels being adapted to further prevent the forward movement of the rear wheels and maintain the same in engagement with the wheel supporting means when the rod is in another position.

2. An automobile power transmitting device comprising a frame, means for supporting the rear wheels of an automobile, and arranged to be driven thereby, power transmitting means associated with the aforementioned means, said frame being provided with a pair of registering rearwardly inclined slots in the sides thereof adjacent the wheel engaging means and forwardly thereof, a transversely extending rod slidable in said slot, the ends thereof being threaded, grooved wheels secured on the outer ends of the rod and adapted to provide a guide means for positioning the rear wheels of an automobile onto the wheel supporting means when the rod is in its lowermost position in said slots, said grooved wheels further providing a means for preventing the forward movement of the rear wheels and maintaining the same in engagement with said wheel supporting means when the rod is in its uppermost position in the slots, and means for securing the rod in either position.

3. An automobile power transmitting device comprising a frame, means for supporting the rear wheels of an automobile, and arranged to be driven thereby, power transmitting means associated with the aforementioned means, said frame being provided with a pair of registering rearwardly inclined slots in the sides thereof adjacent the wheel engaging means and forwardly thereof, a transversely extending rod slidable in said slot, the ends thereof being threaded, grooved wheels secured on the outer ends of the rod and adapted to provide a guide means for positioning the rear wheels of an automobile onto the wheel supporting means when the rod is in its lowermost position in said slots, said grooved wheels further providing a means for preventing the forward movement of the rear wheels and maintaining the same in engagement with said wheel supporting means when the rod is in its uppermost position in the slots, means for securing the rod in either position, said means comprising nuts threaded on the rod and adapted for engagement with the respective sides of the frame.

In testimony whereof I affix my signature.

LEE B. ZACHARY.